US011828365B2

(12) United States Patent
Mumma et al.

(10) Patent No.: US 11,828,365 B2
(45) Date of Patent: Nov. 28, 2023

(54) LOW PROFILE OUTER BELT SEAL WITH IMPROVED RETENTION

(71) Applicant: Rivian IP Holdings, LLC, Irvine, CA (US)

(72) Inventors: Benjamin Mumma, Huntington Woods, MI (US); Julio Cesar Maldonado Cruz, Canton, MI (US); Maria Guadalupe Gamez Lopez, Canton, MI (US); Daniel Thiel, Wadern (DE)

(73) Assignee: Rivian IP Holdings, LLC, Irvine, CA (US)

( * ) Notice: Subject to any disclaimer, the term of this patent is extended or adjusted under 35 U.S.C. 154(b) by 58 days.

(21) Appl. No.: 17/559,317

(22) Filed: Dec. 22, 2021

(65) Prior Publication Data

US 2023/0034558 A1 Feb. 2, 2023

Related U.S. Application Data

(60) Provisional application No. 63/226,488, filed on Jul. 28, 2021.

(51) Int. Cl.
*F16J 15/02* (2006.01)
(52) U.S. Cl.
CPC .................................. *F16J 15/025* (2013.01)
(58) Field of Classification Search
CPC .... F16J 15/00; F16J 15/02; F16J 15/46; F16J 15/48; F16J 15/025; F16J 15/027; B60J 10/00; B60J 10/70; B60J 10/74; B60J 10/79; B60J 10/17; B60J 10/88; B60J 10/27; B60J 5/00; B60J 5/04; B60J 5/0401; B60J 5/0402; B60J 1/00
USPC ........................................................ 277/652
See application file for complete search history.

(56) References Cited

U.S. PATENT DOCUMENTS

| 10,994,593 | B2 * | 5/2021 | Okazaki | B60J 5/0402 |
| 2007/0068085 | A1 * | 3/2007 | Ninomiya | B60J 10/16 49/489.1 |
| 2018/0312048 | A1 * | 11/2018 | Schaefer | B60J 5/0402 |

OTHER PUBLICATIONS

"Ford Mustang Weatherstripping", Weather Strip Depot, Oct. 11, 2022, 9 pages, Online available at: https://weatherstripdepot.com/collections/ford-mustang-weatherstripping.

* cited by examiner

*Primary Examiner* — Nathan Cumar
(74) *Attorney, Agent, or Firm* — Haley Guiliano LLP

(57) ABSTRACT

Systems and methods are presented herein for providing a low-profile outer belt seal that has features enabling high levels of retention to a vehicle door assembly. The outer belt seal comprises a linear insert that has two exterior opposite sides. On at least one of the exterior opposite sides, a gripping structure protrudes to enable a friction-based connection between the outer belt seal and a wall of an opening into which the lower extending portion is inserted. A sealing lip extends from the linear insert and is arranged to make contact with a movable window capable of translating vertically proximate to the belt seal. The sealing lip creates a sealing surface that prevents water translating down the moveable window into a door assembly.

20 Claims, 5 Drawing Sheets

LOW PROFILE OUTER BELT SEAL WITH IMPROVED RETENTION

CROSS REFERENCE TO RELATED APPLICATIONS

This disclosure claims the benefit of U.S. Provisional Application No. 63/226,488, filed Jul. 28, 2021, which is hereby incorporated by reference herein in its entirety.

INTRODUCTION

The present disclosure is directed to systems and methods for reducing an amount of outer belt seal that remains visible in a vehicle door assembly and, more specifically, to systems and methods that incorporate a outer belt seal that has features enabling high levels of retention to the vehicle door assembly.

SUMMARY

Belt line seals are utilized to create a seal against an actuated window within a door assembly to limit or prevent the intrusion of fluids into the body of the door assembly. A belt line seal is positioned between a door panel and a surface of the actuated window. The top of the door assembly often utilizes an upwards pointing flange or lip as a connection point for the belt line seal, leading to a large visible protruding surface created by the belt line seal when affixed to the flange or lip of the door assembly. Current approaches leave at least a portion of belt seal material exposed and may or may not incorporate one or more cladding elements to hide or cover the exposed portion of the belt line seal. However, the cladding elements and/or the belt seal material are still visible and prominent relative to the exterior door panel.

These and other deficiencies are addressed by the exemplary belt seal structures and door assemblies described herein in which, for example, a portion of the belt seal structure is recessed into an opening. In some embodiments, a belt seal structure includes a linear insert having two exterior opposite sides. The linear insert pairs with an opening having two opposing inner surfaces. The linear insert has a first exterior side that is structured to be a gripping surface based on the geometric structure of the side. When the linear insert is positioned in the opening to which it is paired, the gripping structure engages with a first one of the inner surfaces to retain the linear insert in the opening. For example, the gripping structure may deform such that there is an increase in friction between the gripping structure and the inner surface. Additionally, a sealing lip is coupled to the linear insert and is structured such that it makes contact with a movable window when the linear insert is positioned in the opening to create a water tight seal against the window to prevent water from entering the door in which the window moves. The term coupled, as used in this disclosure, may include connecting two separate pieces or more than one structure appearing as separate pieces and instead are a contiguous integrated structure.

These techniques solve the problems of the other approaches described above. In particular, this approach does not rely on cladding as the primary or only mode of reducing the protruding aspects of the beltline seal or reduce visibility of the belt line seal. Instead, the insert is structured to be positioned within a u-channel that forms a recessed pocket towards the top of an exterior door panel such that when the insert achieves an installation position the body of the insert is recessed from view. Additionally, gripping structures increase the friction between the insert and the walls of the opening into which the insert is positioned. Thus, the insert remains secure as a result of the structure and is not readily displaced once positioned. Additionally, this approach reduces the complexity of a door assembly by incorporating the opening for the insert, in which the insert is positioned, into an existing panel of the door which has a recessed u-channel formed by the top-most portion of the panel. By incorporating this continuous feature, instead of utilizing add on structures to the panel to create an opening for the insert or utilizing add on cladding to reduce visibility of the belt line seal material, the u-channel reduces component count and assembly complexity by reducing visibility of the belt line seal material or cladding assembly.

In some embodiments, the belt seal comprises a belt seal structure comprising a main body. The main body has a lower portion that is inserted into an opening of a u-channel and an upper portion. In some embodiments, the upper portion is structured to secure a cap. When the linear insert is positioned in the opening of the u-channel, the upper portion of the main body extends above the opening. A first contact surface is created between a sealing lip and a window that moves within a door assembly. A first arm includes an extension from the main body and enables the sealing lip to create the first contact surface.

In some embodiments, a second contact surface is created by a second arm that extends from either the main body or the first arm to the moveable window. For example, the second arm may couple the second contact surface to the upper portion of the main body, or the second arm may couple the second contact surface to the first arm, which extends from the main body. Additionally, the first and second contact surfaces may incorporate either a mechanically secured layer of wear resistant material that reduces drag and friction between surfaces contacting moving glass while also preventing marks from appearing on a glass window or an applied layer of wear resistant material. In some embodiments, both the first and second arms may comprise a body that is at least primarily a wear resistant material. For example, the insert may consist of one material that does not have the same wear resistant properties of the first and second arms. The first and second arms may be secured to the main body of the insert, or to one another, by either adhesive materials or a connection created by incorporating a mechanical fastener or other connecting structure.

In some embodiments, the gripping structure of the insert incorporates at least one protrusion that makes contact with a second one of the inner surfaces to retain the linear insert in the opening by creating friction between the at least one protrusion and the second one of the inner surfaces. For example, the gripping structure may comprise a plurality of cylindrical extensions that, when deformed as a result of contact-based translation, increases friction to prevent displacement of the insert by vertical translation. In another example, the gripping structure includes a number of spaced nubs which increase the width of the insert to create a tighter fit between the insert and the inner surface. In another example the gripping structure is a pair of lips that extend along the length of the linear insert creating a pair of contact surfaces that extend along the entire length of the u-channel into which the lower portion is inserted. In some embodiments, fasteners such as screws or other attachment methods may be used for additional retention at the front or rear ends of the belt seal to secure belt seal to the door.

In some embodiments, the upper portion of the main body includes a head portion. In some embodiments, a cap is mechanically seated to the head portion, secured in place by an adhesive layer or an adhesive strip, or a combination thereof. In addition to the mechanical or adhesive based securing aspects of the cap, the cap may also have an inner projection that engages with an edge of the head portion to secure the cap to the head portion.

In some embodiments, the cap includes at least two inner projections positioned to extend in opposite directions. The head portion of belt seal may have a first lip, which extends towards the movable window when the linear insert is positioned in the opening, that forms a slot for a first edge of the mechanically seated cap. The head portion may also have a first pair of flanges in place of or as an extension from the first lip that forms an inner face of the head portion. The head portion may also have a second pair of flanges extending from an outer face of the head portion. The first pair of flanges may be structured to secure a first lip of a seated cap that wraps around the head portion and extends inwards towards a centerline of the seated cap. The second pair of flanges are structured to secure a second lip of the seated cap that wraps around the head portion, extends inwards towards a centerline of the seated cap, and protrudes in an opposite direction of the first lip. The lips of the seated cap may be incorporated into or be an extension of the inner projection of the cap.

In some embodiments, a door assembly includes an exterior door panel comprising a u-channel. The u-channel may incorporate an opening into which a belt seal structure incorporating any or all of the features herein may be inserted. In some embodiments, the exterior door panel, including the u-channel, is formed from a single continuous metal sheet. For example, the u-channel may be formed from three contiguous bends of the exterior door panel. The first bend may form a first opposing inner surface, the second bend may form a bottom most surface, and the third bend may form a second opposing inner surface of the u-channel. The u-channel may include a first inner wall that is proximal to a window and a second outer wall that is proximal to an exterior surface of the exterior door panel. In some embodiments, the first inner wall is a height that is shorter than the second outer wall.

In some embodiments, the door assembly may be manufactured by providing an exterior door panel comprising a u-channel. A belt seal structure, incorporating one or more of the features described herein, is paired with the u-channel. The belt seal may be pressed into the u-channel of the exterior door panel such that a gripping structure of the belt seal reaches at least a minimum depth in the u-channel. A seated cap is secured to the top surface of a head portion of the belt seal.

BRIEF DESCRIPTIONS OF THE DRAWINGS

The above and other objects and advantages of the disclosure may be apparent upon consideration of the following detailed description, taken in conjunction with the accompanying drawings, in which.

DETAILED DESCRIPTION

Methods and systems are provided herein for providing a low-profile outer belt seal that has features enabling high levels of retention to a vehicle door assembly.

Figure 1:
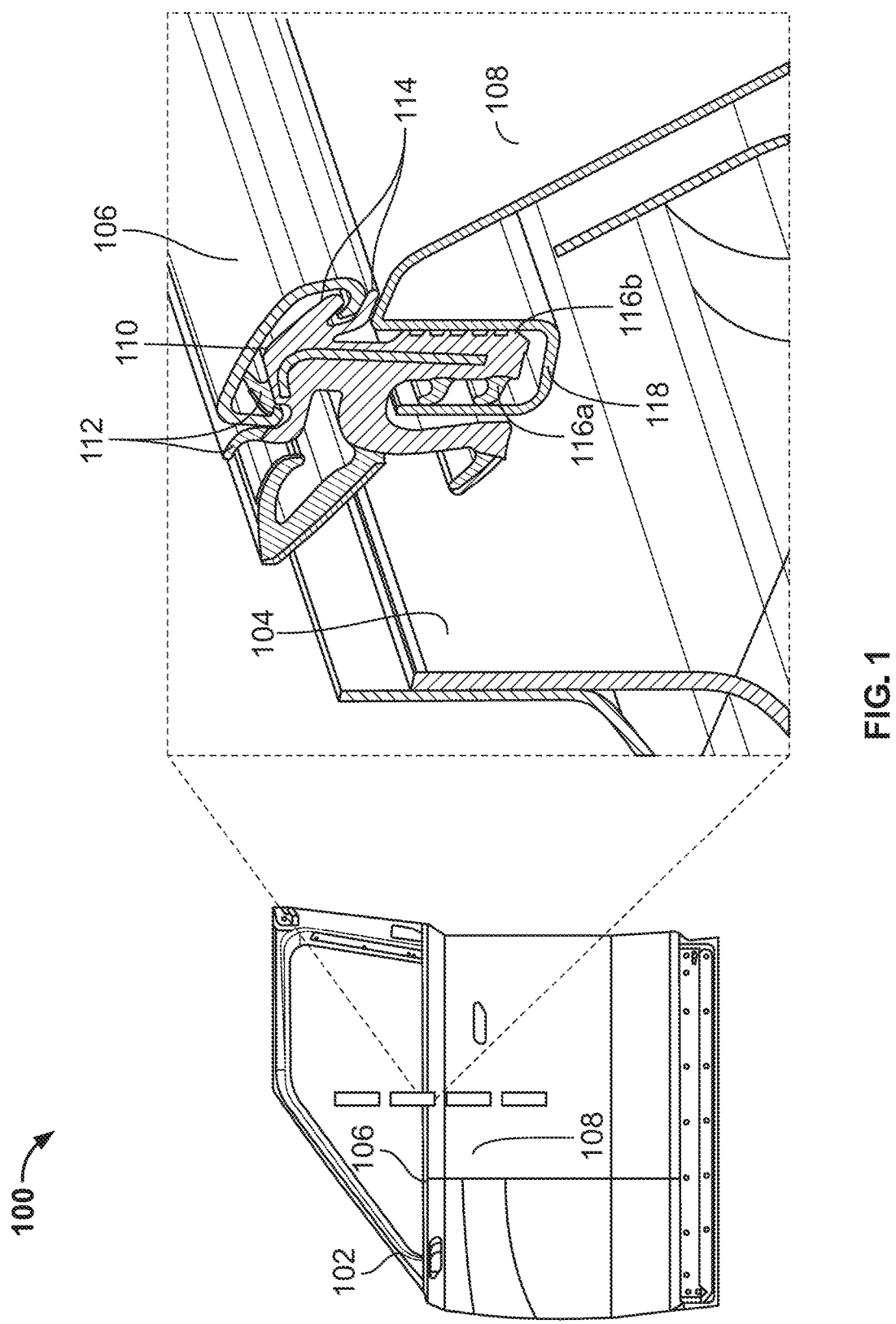
FIG. 1 illustrates an example door assembly incorporating low profile belt seal assembly with features that increase vertical friction between a u-channel of the door assembly and the belt seal assembly, in accordance with some disclosed embodiments.

FIG. 1 shows door assembly 100 that incorporates a low-profile belt seal assembly with features that increase vertical friction between a u-channel of the door assembly and the belt seal assembly.

Door assembly 100 comprises door frame 102, which houses a window proximate to inner door 104. The window may translate vertically within door frame 102 when prompted by an actuator proximate to a vertical plane defined by inner door 104. Seated cap 106 is a visible portion of a belt seal assembly inserted into a u-channel formed from a top-most portion of exterior door panel 108.

Belt seal assembly 110 comprises a main body having a lower portion that is inserted into the u-channel of the exterior door panel 108. Belt seal assembly 110 is structured as a linear insert comprising two exterior opposite sides that extend a length of the u-channel to form a seal for door assembly 100. The lower portion is positioned within a u-channel that has a first exterior wall that is taller than a second interior wall that is proximate to inner door 104. The main body also has an upper portion that includes a head portion to which seated cap 106 is secured. Extending from the head portion are flanges 112 and flanges 114. Flanges 112 of belt seal assembly 110 form a secure fit around a first interior lip of seated cap 106. Flanges 114 of belt seal assembly 110 face in an opposite direction of flanges 112 and form a secure fit around a second interior lip of seated cap 106. It should be noted that the flange features may have different shapes or dimensions than those depicted in FIG. 1 and may incorporate additional features to enable retention to the cladding. Additionally, a sealing lip is coupled to the linear insert and is arranged to make contact with a movable window when the linear insert is positioned in the opening of the u-channel. In some embodiments, the sealing lip comprises a contact arm which extends from a main body of belt seal assembly 110 to the movable window.

The lower portion of the main body has gripping features 116a and 116b. Gripping features 116a contact a first inner surface corresponding to the second shorter more interior wall. Gripping features 116a are shown as finger like extensions structured such that, when they deform in response to contact or translation, they increase friction with the first inner surface. Gripping features 116b contact a second inner surface corresponding to the first taller more exterior wall. Gripping features 116b are shown as a plurality of nubs which increase friction between the lower portion of the main body and second inner surface when the nubs structurally deform based on translation or contact. Lower wall 118 forms the bottom most portion of the u-channel. In some embodiments, an insertion depth is defined based on a relative distance that a lowest point on belt seal assembly 110 and the face of lower wall 118 that faces through the opening of the u-channel. A sufficient insertion depth may be a function of an amount of translation needed to deform gripping features 116a and 116b to ensure belt seal assembly 110 remains within the u-channel. The gripping features depicted in FIG. 1 are an illustrative example of a single embodiment of gripping features that may be utilized in belt seal assembly 110 to secure the lower portion of belt seal assembly 110 in the depicted u-channel. It should be noted that the gripping features may have different shapes or dimensions than those depicted in FIG. 1 and may incorporate additional features to enable the lower portion of belt seal assembly 110 to remain at an inserted depth in the depicted u-channel.

Belt seal assembly 110 is vertically inserted into the u-channel of exterior door panel 108. When belt seal assembly 110 is inserted to a depth in the u-channel corresponding to an installation position, the result is a low-profile belt seal assembly with seated cap 106 as the primarily visible component of belt seal assembly 110. In some embodiments, a portion of a flange of flanges 114 may be visible under a lip of seated cap 110.

The u-channel depicted in FIG. 1 comprises a pair of walls, attached to lower wall 118, that are different heights. The heights of the walls are different heights to enable a portion of the main body of belt seal assembly 110 to be structured as a part of contact arms which create a contact surface with a window that would be positioned proximate to inner door 104. The inner wall, proximate to inner door 104, is depicted as being shorter than the outer wall, shown as being formed by a first bend of material from exterior door panel 108. The shorter inner wall enables the pair of contact arms to extend from the main body of belt seal assembly 110 such that the head portion can enable a low-profile belt seal assembly to be visible when door assembly 100 is fully assembled. It should be noted that the relative heights of the pair of walls forming the u-channel in FIG. 1 are a single exemplary embodiment of the relative heights of the pair of walls, which may be structured such that they are the same height or other relative height. In some embodiments, the heights of the walls may be structured in any manner such that the visible portion of belt seal assembly 110 may be considered a reduced or low profile. The u-channel is continuous with an outer panel of door assembly 100. The u-channel comprises an integrated u-channel that forms a strong, lightweight structure to support the beltline seal. In some embodiments, the u-channel is integrated into a vehicle assembly comprising four doors, wherein each of the four doors comprises an outer panel with the u-channel.

Figure 2:
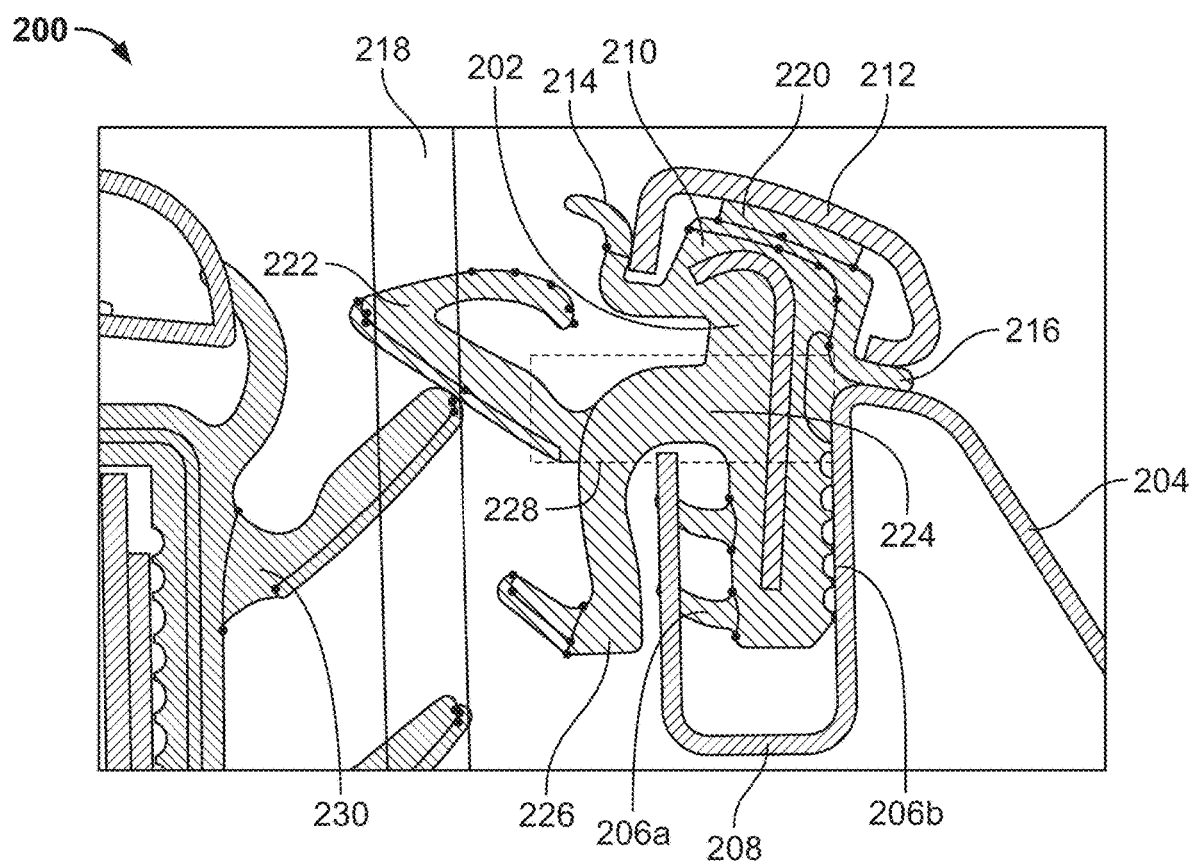
FIG. 2 illustrates an example door assembly incorporating a belt seal assembly that utilizes adhesive to mechanically secure a seated cap to a head portion of the belt seal assembly, in accordance with some disclosed embodiments.

FIG. 2 shows door assembly 200 which utilizes adhesive to secure a seated cap to a head portion of a belt seal assembly. Door assembly 200 may be used in place of belt seal assembly 110 in the door assembly 100 of FIG. 1 and/or may incorporate one or more features of belt seal assembly 110 of FIG. 1, in accordance with some embodiments of this disclosure.

Door assembly 200 includes belt seal assembly 202. In some embodiments, door assembly 200 incorporates at least one feature of belt seal assembly 110 of FIG. 1 into belt seal assembly 202. Belt seal assembly 202 is structured as a linear insert comprising two exterior opposite sides that extend a length of the u-channel to form a seal for door assembly 200. A lower portion of a main body of belt seal assembly 202 is positioned within a u-channel formed at a top-most portion of exterior door panel 204. Exterior door panel 204 may incorporate any or all of the features of exterior door panel 108 of FIG. 1. Belt seal assembly 202 includes main body 224 that includes an upper portion that includes head 210. Secured to head 210 is seated cap 212. The lower portion of the main body is positioned within a u-channel that has a first exterior wall that is taller than a second interior wall that is proximate to window 218.

The lower portion of the main body has gripping features 206a and 206b. Gripping feature 206a contacts a first inner surface corresponding to the second shorter more interior wall. Gripping feature 206a is shown as a finger like extension structured such that, when it deforms in response to contact or translation, it increases friction with the first inner surface. Gripping feature 206b contacts a second inner surface corresponding to the first taller more exterior wall. Gripping feature 206b is shown as a plurality of nubs which increase friction between the plurality of walls and second inner surface when structurally deformed based on translation or contact. Lower wall 208 forms the bottom most portion of the u-channel. A sufficient insertion depth is defined based on a relative distance that a lowest point on belt seal assembly 202 and the face of lower wall 208 that faces through the opening of the u-channel. The sufficient insertion depth may be a function of an amount of translation required to deform gripping features 206a and 206b to ensure belt seal assembly 202 remains within the u-channel. The gripping features depicted in FIG. 2 are an illustrative example of a single embodiment of gripping features that may be utilized in belt seal assembly 202 to secure the lower portion of belt seal assembly 202 in the depicted u-channel. It should be noted that the gripping features may have different shapes or dimensions than those depicted in FIG. 2 and may incorporate additional features to enable the lower portion of belt seal assembly 202 to remain at an inserted depth in the depicted u-channel.

Seated cap 212 may incorporate at least one feature of seated cap 106 of FIG. 1. Inner flange 214 is a feature of head 210 that extends towards window 218. Inner flange 214 forms a snug fit channel with head 210 forming at least a side of the channel into which a lip of seated cap 212 is positioned when installed in belt seal assembly 210. Outer flange 216 is a feature of head 210 that extends towards exterior door panel 204. Outer flange 216 is structured to provide a second point of contact with head 210 for seated cap 212 to remain in a secured position. In some embodiments, inner flange 214 and outer flange 216 are separate pieces not continuous with head 210 and the three components are made of different materials. In some embodiments, inner flange 214 and outer flange 216 are continuous with head 210 and are formed out of a same material. Adhesive layer 220 provides a securing surface to connect seated cap 212 to head 210. In some embodiments, adhesive layer 220 is a strip of adhesive material arranged axially along a length of belt seal assembly 202. In some embodiments, adhesive layer 220 is used in combination with or in place of fasteners. In some embodiments, adhesive layer 220 is used in combination with flanges 112 and 114 of FIG. 1.

Extending from main body 224 is either primary contact arm 222, secondary contact arm 226, or some combination thereof. A sealing lip is coupled to the linear insert and is arranged to make contact with a movable window when the linear insert is positioned in the opening of the u-channel. In some embodiments, the sealing lip comprises a contact arm which extends from a main body of belt seal assembly 202 to the movable window. For example, primary contact arm 222 may include an extension, continuous with main body 224, that incorporates secondary contact arm 226. In some embodiments, secondary contact arm 226 may comprise an extension continuous with main body 224 with primary contact arm 222 comprising a separate extension affixed to secondary contact arm 226, as shown in FIG. 2. In some embodiments, both primary contact arm 222 and secondary contact arm 226 may extend from main body 224 which are continuous with main body 224. In some embodiments, both primary contact arm 222 and secondary contact arm 226 are formed out of a portion of material that is continuous with main body 224. In some embodiments, either or both of primary contact arm 222 and secondary contact arm 226 are formed out of a portion of material that is affixed to a portion of the material comprising main body 224. For example, as shown in FIG. 2, primary contact arm 222 may be formed separately from secondary contact arm 226, which is depicted as an extension formed out of material continuous with main body 224. The material comprising the structure of primary contact arm 222 may be affixed, by adhesive or mechanical means (e.g., securing protrusions or fasteners), to secondary contact arm 226, as shown in FIG. 2, or to main body 224.

Region 228 provides an illustrative example of the elements of belt seal assembly 202 that may be incorporated into main body 224. For example, region 228 outlines main body 224 such that the lower portion of main body 224 with gripping features 206a and 206b are contained with a u-channel, which is formed out of material continuous with exterior door panel 204, as shown in FIG. 2. Additionally, each of primary contact arm 222 and secondary contact arm 226 are shown in FIG. 2 as having features encompassed by region 228, and the embodiment shown in FIG. 2 is an example of a single embodiment of the embodiments described in the present disclosure. Region 228 further encompasses a neck portion continuous with head 210, which may have a relative width or height as compared to the u-channel, in which the lower portion of the main body is inserted, to enable a lower or higher profile of the belt seal structure covered by seated cap 212. The neck portion encompassed by region 228 as shown in FIG. 2 is intended to be a non-limiting illustrative example of the relative sizing of the neck portion, main body 224, head 210, the lower portion of main body 224, and the u-channel. Each of the listed elements may be structured such that their dimensions are different than those depicted in FIG. 2 so as to enable different belt seal assemblies with different profiles to be utilized for various door assemblies.

In some embodiments, main body 224, primary contact arm 222, and secondary contact arm 226 all are structured out of a same material. In some embodiments, main body 224, primary contact arm 222, and secondary contact arm 226 are separate materials. In some embodiments, primary contact arm 222 and secondary contact arm 226 include a wear resistant material that reduces drag/friction on a contact surface of a glass window and also prevents marks from appearing on the glass window that is either a coating or a secured separate layer of material. The wear resistant material is structured to prevent water from translation down window 218 into a door assembly. Primary contact arm 222 makes a first contact surface with window 218. As window 218 translates vertically up, primary contact arm 222 is dragged upwards and secondary contact arm 226 is drawn towards window 218, creating a second contact surface. Secondary contact arm 226 may comprise an anti-rattle feature for slamming a door by bracing window 218 such that it does not contact metal from a door assembly. Also shown in FIG. 2 is interior belt seal 230, which is secured to a support structure on the interior side of the door and forms a seal on the opposite side of the window.

Belt seal assembly 202 is vertically inserted into the u-channel of exterior door panel 204. When belt seal assembly 202 is inserted to a depth in the u-channel corresponding to an installation position, the result is a low-profile belt seal assembly with seated cap 212 as the primarily visible component of belt seal assembly 202. In some embodiments, a portion of outer flange 216 may be visible under a lip of seated cap 212.

The u-channel depicted in FIG. 2 comprises a pair of walls, attached to lower wall 208, that are different heights. The heights of the walls are different heights to enable a portion of main body 224 of belt seal assembly 202 to be structured as a part of primary contact arm 222 and secondary contact arm 226, which create a contact surface with window 218. The inner wall, proximate to window 218, is depicted as being shorter than the outer wall, shown as being formed by a first bend of material from exterior door panel 204. The shorter inner wall enables the pair of contact arms to extend from main body 224 of belt seal assembly 202 such that head 210 can enable a low-profile belt seal assembly to be visible when door assembly 200 is fully assembled. It should be noted that the relative heights of the pair of walls forming the u-channel in FIG. 2 are a single exemplary embodiment of the relative heights of the pair of walls, which may be structured such that they are the same height or other relative height. In some embodiments, the heights of the walls may be structured in any manner such that the visible portion of belt seal assembly 202 may be considered a reduced or low profile. The u-channel is continuous with an outer panel of door assembly 200. The u-channel comprises an integrated U-channel that forms a strong, lightweight structure to support the beltline seal.

Figure 3:
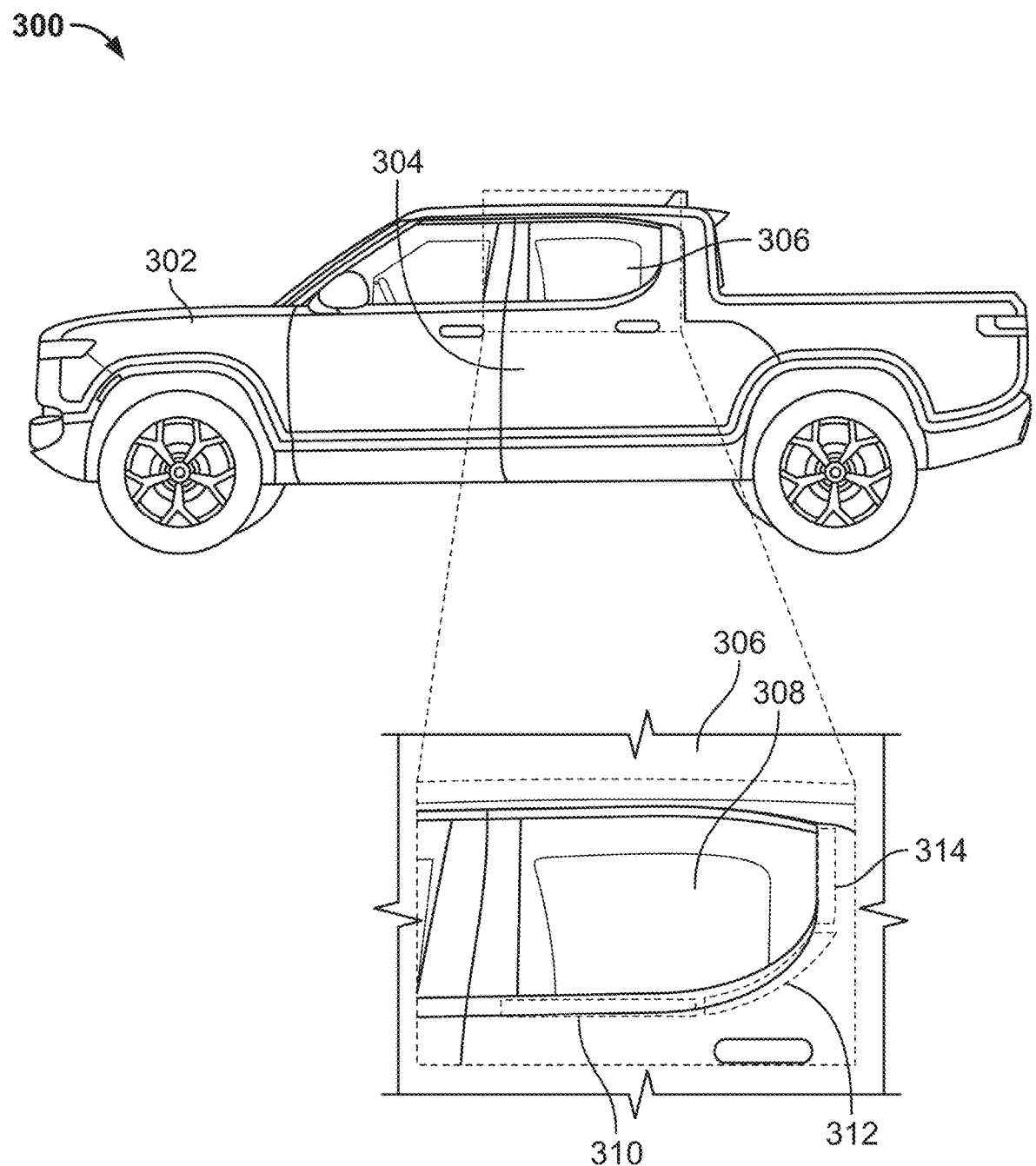
FIG. 3 illustrates an example vehicle assembly incorporating a door that utilizes a segmented seated cap to cover a belt seal assembly inserted in a continuous u-channel of the door and the u-channel is structured to have straight and curved portions, in accordance with some disclosed embodiments.

FIG. 3 shows a vehicle 300 which includes a door that utilizes a segmented u-channel, comprising both straight and curved segments, covered by a seated cap affixed to a head portion of a belt seal assembly inserted in the u-channel of the door. Vehicle 300 may incorporate the features of door assembly 100 of FIG. 1 and/or door assembly 200 of FIG. 2, in accordance with some embodiments of this disclosure.

Vehicle 300 comprises a chassis assembly, a powertrain assembly, and vehicle body 302. Attached to vehicle body 302 is door 304. Door 304 comprises features such as hinges, a handle, an exterior panel, and window assembly 306. Window assembly 306 may comprise any or all of the elements depicted in FIGS. 1 and 2 such that door 304 comprises a seal created by the belt seal assemblies depicted in FIGS. 1 and 2, configured to reduce or prevent the ingress of fluids into door 304, against window 308. Window 308 is arranged to translate vertically within door 304. Window assembly 306 is formed to have a first straight portion defining a main body that is at least a portion of the width of door 304, but not the entire length of door 304. In some embodiments, the first straight portion is the entire width of door 304. Window assembly 306 also has a vertically upward curving portion positioned behind, relative to the front of vehicle body 302, of the first straight portion. Extending vertically from the vertically upward curving portion is a third vertical portion defining a rear pillar for window assembly 306.

Window assembly 306 also has straight portion 310, curved portion 312, and vertical portion 314 of a u-channel. A belt seal assembly (e.g., belt seal assembly 110 of FIG. 1, belt seal assembly 202 of FIG. 2, or any combination thereof) is inserted into the u-channel formed by portions 310, 312, and 314. In some embodiments, the belt seal assembly is covered by cap (e.g., seated cap 106 of FIG. 1 or seated cap 212 of FIG. 2) having a straight, upward curving, and vertical segments, which can be continuous or discrete segments, that correspond to the shape of the u-channel. In some embodiments, the belt seal assembly in portions 310, 312, and 314 is a continuous belt seal assembly.

The u-channel of window assembly 308 may be formed from material of the exterior panel of door 304 by any process known by those skilled in the art. As shown in window assembly 308, some windows and doors have curved portions based at least in part on the design of the vehicle body or style preferences corresponding to the vehicle body. When trying to form a continuous u-channel that comprises straight, curved, and vertical portions corresponding to the depicted straight portion 310, curved portion 312, and vertical portion 314 as shown in FIG. 3, a manufacturer may face difficulties forming the curved portion of the u-channel from the same metal sheet used to form the straight and vertical portions. The metal sheet may bind, fold, or crease in response to inputs to shape the curved portion of the u-channel. To address these issues, each portion of the u-channel may be formed in sequential steps. Additionally, separate manufacturing steps may be incorporated to form the curved portion of the u-channel. For example, a segment or all of the curved portion may be formed from a metal sheet or different material separate from the metal sheet that comprises the exterior door panel used to form the straight and vertical portions of the u-channel.

In some embodiments, the separately formed curved portion may be secured (e.g., affixed or mounted by either a mechanical means or adhesive or a combination thereof) to the exterior door panel and positioned such that the u-channel is continuous between the straight, curved, and vertical portions. In some embodiments, an element of the curved portion may be formed from a separate metal sheet or material. For example, the inner and/or bottom wall of the u-channel may be formed from the separate metal sheet or material. The inner and/or bottom wall may be secured to the outer wall, which may be continuous with the exterior door panel used to form the straight and vertical portions of the u-channel. Each of the straight, curved, and vertical portions of the u-channel may include a respective beginning edge and ending edge. When arranged in a door assembly, the ending edge of a portion aligns with a beginning edge of a connected portion. For example, the ending edge of the straight portion may align with the beginning edge of the curved portion. In some embodiments, the ending edge of the curved portion may align with the beginning edge of the vertical portion.

Figure 4:
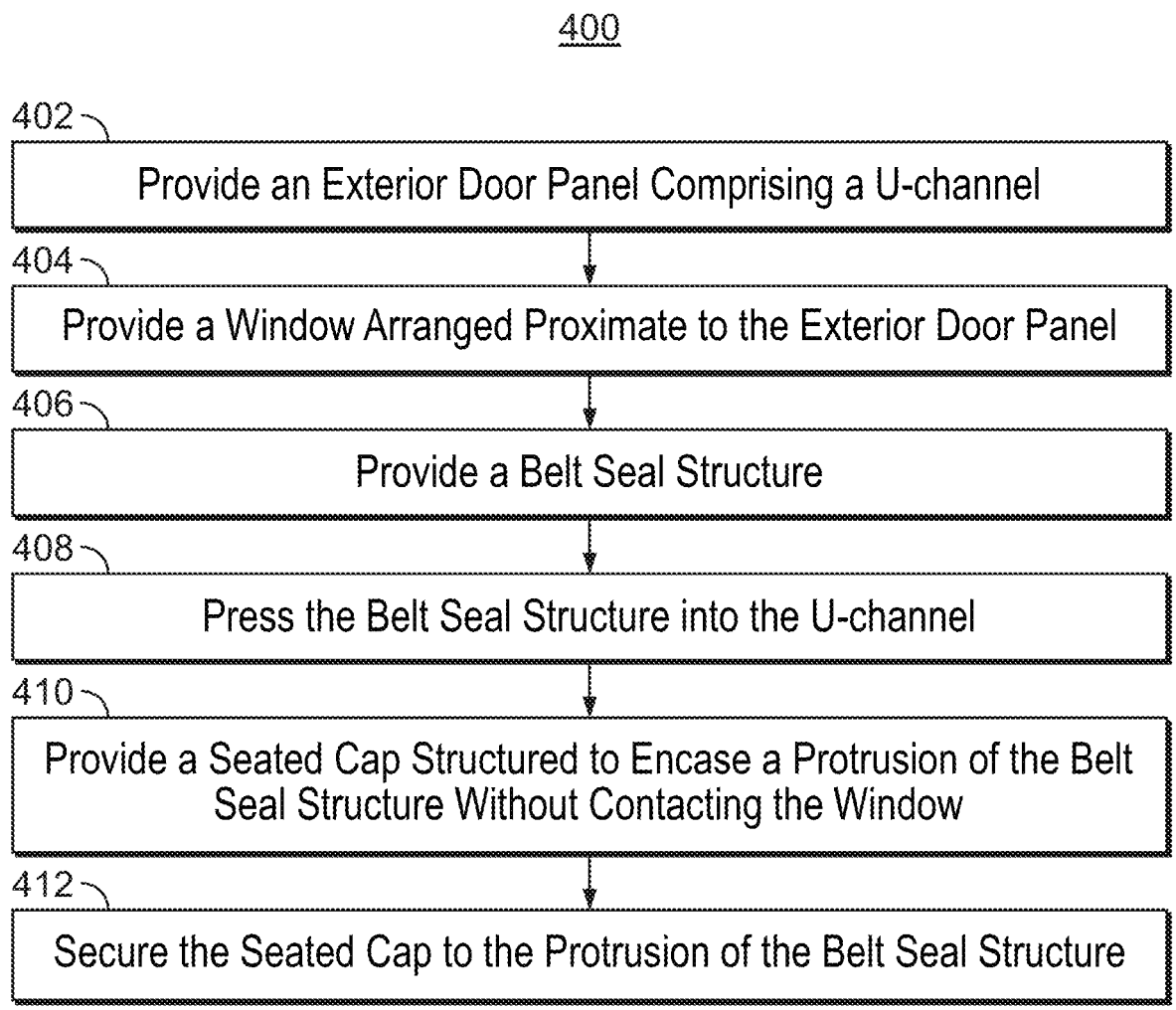
FIG. 4 illustrates an example method for manufacturing a door assembly that incorporates a belt seal assembly; in accordance with some disclosed embodiments.

FIG. 4 illustrates method 400 for manufacturing a door assembly that incorporates a belt seal assembly. Method 400 may incorporate or be used to manufacture aspects of door assembly 100 of FIG. 1, door assembly 200 of FIG. 2, and/or vehicle 300 of FIG. 3, in accordance with some embodiments of this disclosure.

At 402, an exterior door panel comprising a u-channel is provided (e.g., exterior door panel 108 of FIG. 1, exterior door panel 204 of FIG. 2, or an exterior door panel corresponding to an exterior surface of door 304 of FIG. 3). At 404, a window is provided to be arranged proximate to the exterior door panel (e.g., window 218 of FIG. 2, or window 308 of FIG. 3). At 406, a belt seal assembly is provided for inserting into the u-channel of the exterior door panel (e.g., belt seal assembly 110 of FIG. 1, belt seal assembly 202 of FIG. 2, or a belt seal assembly that incorporates any combination of features thereof). At 408, the belt seal assembly is pressed into the u-channel. In some embodiments, the belt seal assembly has a specified minimum depth for insertion to enable a friction fit such that the pullout force of the belt seal is above a minimum value. In some embodiments, the minimum depth is a function of the gripping structures on the surface of the belt seal assembly positioned inside the u-channel. When the belt seal assembly is inserted to the minimum depth, a portion of the belt seal assembly contacts the window provided at 404 by a contact surface, which creates a seal to prevent the ingress of fluids into a door assembly in which the window is arranged proximate to the exterior door panel, as shown in FIGS. 1 and 2.

In some embodiments, at 410, a seated cap is provided, and the seated cap is structured to encase a protrusion of the belt seal assembly without contacting the window. For example, the seated cap may be either seated cap 106 of FIG. 1, seated cap 212 of FIG. 2, any or all of straight portion 310, curved portion 312, and vertical portion 314 of FIG. 3, or any combination thereof. The protrusion may be the head of belt seal assembly 110 of FIG. 1, head 210 of FIG. 2, or any combination thereof. In some embodiments, at 412, the seated cap is secured to the protrusion of the belt seal assembly. For example, the seated cap may be secured by adhesive, corresponding flanges on both the seated cap and the protrusion, fasteners, or any combination thereof. In some embodiments, the seated cap may be secured to the belt seal prior to delivering to the door for assembly.

Figure 5:
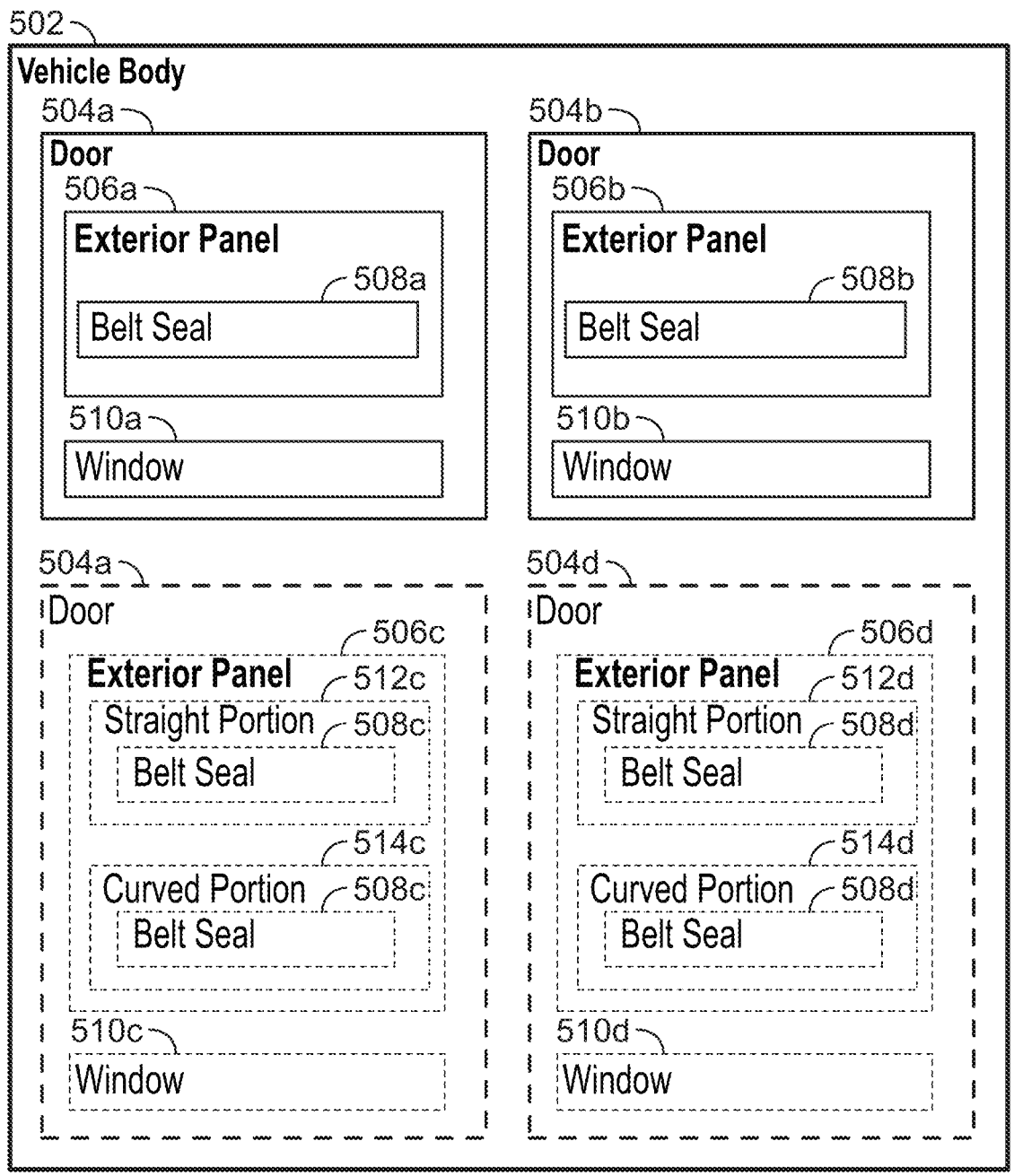
FIG. 5 illustrates an example vehicle assembly that includes multiple door assemblies, in accordance with some disclosed embodiments.

FIG. 5 illustrates vehicle 500 that includes multiple door assemblies. Vehicle 500 may incorporate door assembly 100 of FIG. 1, door assembly 200 of FIG. 2, vehicle 300 of FIG. 3, and/or may be manufactured using method 400 of FIG. 4, in accordance with some embodiments of the disclosure.

Vehicle 500 includes a vehicle body 502. Attached to vehicle body 502 are door assemblies 504a and 504b. In some embodiments, vehicle body 502 has two additional door assemblies 504c and 504d that are positioned rearward of door assemblies 504a and 504b. Each of door assemblies 504a-d include exterior panels 506a-d, respectively, proximate to each of windows 510a-d, respectively. Each of exterior panels 506a-d may incorporate any feature or all of exterior door panel 108 of FIG. 1 and/or all of door 304 of FIG. 3. Inserted into each of exterior panels 504a-d are belt seals 508a-d, respectively. Each of belt seals 508a-d may incorporate any feature or all of belt seal assembly 110 of FIG. 1 and/or belt seal assembly 202 of FIG. 2.

Each of door assemblies 504c and 504d have exterior panels 506c and 506d, respectively, which include straight portions 512c and 512d, respectively. Additionally, exterior panels 506c and 506d include curved portions 514c and 514d, respectively. Inserted into each of straight portion 512c and curved portion 514c is belt seal 508c. Similarly, inserted into each of straight portion 512d and curved portion 512d is belt seal 508d. Each of the straight portions and curved portions may be represented by straight seated cover portion 310 and curved seated cover portion 312 of FIG. 3, respectively.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

While some portions of this disclosure may refer to "convention" or examples, any such reference is merely to provide context to the instant disclosure and does not form any admission as to what constitutes the state of the art.

What is claimed is:

1. A belt seal structure comprising:
   a linear insert comprising a main body with a first portion and a second portion that is comprised of two exterior opposite sides, the linear insert configured to be installed in a channel, wherein:
   when the linear insert is positioned in the channel, the first portion extends above the channel;
   a first one of the exterior sides of the second portion comprises a gripping structure arranged such that when the linear insert is positioned in the channel, the gripping structure engages with a first one of a pair of inner surfaces of the channel that faces the gripping structure to retain the linear insert in the channel; and
   a sealing lip, comprising a first contact surface and a first arm that couples the first contact surface to the first portion, arranged to make contact with a movable window when the linear insert is positioned in the channel.

2. The belt seal structure of claim 1, wherein the gripping structure comprises at least one protrusion configured to make contact with the first one of the pair of inner surfaces to retain the linear insert in the channel by creating friction between the at least one protrusion and the first one of the pair of inner surfaces.

3. The belt seal structure of claim 2, wherein the gripping structure further comprises at least one protrusion configured to make contact with a second one of the pair of inner surfaces to retain the linear insert in the channel by creating friction between the at least one protrusion and the second one of the pair of inner surfaces.

4. The belt seal structure of claim 1, wherein:
   the first portion of the main body comprises an upper portion;
   the second portion of the main body comprises a lower portion; and
   the lower portion extends along the pair of inner surfaces of the channel.

5. The belt seal structure of claim 1, wherein the first portion of the main body comprises a head portion.

6. The belt seal structure of claim 5, further comprises a cap that is mechanically seated to the head portion.

7. The belt seal structure of claim 6, wherein the mechanically seated cap is secured in place by an adhesive.

8. The belt seal structure of claim 6, wherein the cap comprises an inner projection that engages with an edge of the head portion to secure the cap to the head portion.

9. The belt seal structure of claim 6, wherein the head portion further comprises a first lip, which extends towards the movable window when the linear insert is positioned in the opening, wherein the first lip forms a slot for a first edge of the mechanically seated cap.

10. The belt seal structure of claim 6, wherein the head portion further comprises a first pair of flanges extending from an inner face of the head portion and a second pair of flanges extending from an outer face of the head portion, wherein:
    the first pair of flanges are structured to secure a first lip of the seated cap that wraps around the head portion and extends inwards towards a centerline of the seated cap; and
    the second pair of flanges are structured to secure a second lip of the seated cap that wraps around the head portion, extends inwards towards a centerline of the seated cap, and protrudes in an opposite direction of the first lip.

11. The belt seal structure of claim 1, wherein the sealing lip further comprises a second contact surface and second arm that couples the second contact surface to the upper first portion of the main body.

12. The belt seal structure of claim 11, wherein the first and second contact surfaces comprise a layer of wear resistant material that prevents marks from appearing on a glass window.

13. The belt seal structure of claim 11, wherein the sealing lip comprises a central body that is connected to the first portion of the main body at one end, and the central body is also connected to each of the first and second arms at an opposite end of the central body.

14. A door assembly comprising:
    an exterior door panel comprising a u-channel;
    a belt seal structure comprising:
        a linear insert, having a main body with a first portion and a second portion that is comprised of two exterior opposite sides, arranged in the u-channel, wherein:
        the first portion extends above the u-channel;
        a first one of the exterior sides of the second portion comprises a gripping structure that engages with a first one of a pair of inner surfaces of the u-channel that faces the gripping structure to retain the linear insert in the u-channel; and
        a sealing lip, comprising a first contact surface and a first arm that couples the first contact surface to the first portion, arranged to make contact with a movable window.

15. The door assembly of claim 14, wherein the exterior door panel, including the u-channel, is formed from a single continuous metal sheet.

16. The door assembly of claim 14, wherein:
    the u-channel is formed from three contiguous bends of the exterior door panel;
    the first contiguous bend forms the first one of the pair of inner surface;
    the second contiguous bend forms a bottom most surface of the u-channel; and
    the third contiguous bend forms a second one of the pair of inner surfaces.

17. The door assembly of claim 14, wherein the u-channel comprises a first inner wall that is proximal to a window and a second outer wall that is proximal to an exterior surface of the exterior door panel, and wherein the first inner wall is a height that is shorter than the second outer wall.

18. The door assembly of claim 14, wherein the gripping structure comprises at least one protrusion configured to make contact with the first one of the pair of inner surfaces to retain the linear insert in the u-channel by creating friction between the at least one protrusion and the first one of the pair of inner surfaces such that the at least one protrusion mechanically deforms when installed in the u-channel.

19. The door assembly of claim 14, wherein the u-channel comprises a straight portion and a curved portion, wherein the straight portion is formed from the exterior door panel, and wherein the curved portion is separately formed and mounted to the exterior door panel such that it aligns with the straight portion.

20. A method of manufacturing a door assembly, the method comprising:
   providing an exterior door panel comprising a u-channel;
   providing a belt seal structure, the belt seal structure comprising:
      a linear insert, having a main body with a first portion and a second portion that is comprised of two exterior opposite sides, configured to be installed in the u-channel, wherein:
         when the linear insert is positioned in the u-channel, the first portion extends above the u-channel;
         a first one of the exterior sides of the second portion comprises a gripping structure arranged such that when the linear insert is positioned in the u-channel, the gripping structure engages with a first one of a pair of inner surfaces that faces the gripping structure to retain the linear insert in the u-channel; and
         a sealing lip, comprising a first contact surface and a first arm that couples the first contact surface to the first portion, arranged to make contact with a movable window when the linear insert is positioned in the u-channel;
   pressing the belt seal structure into the u-channel such that the gripping structure reaches at least a minimum depth in the u-channel; and
   securing a seated cap to a top surface of a head portion of the belt seal structure.

* * * * *

UNITED STATES PATENT AND TRADEMARK OFFICE
CERTIFICATE OF CORRECTION

PATENT NO. : 11,828,365 B2
APPLICATION NO. : 17/559317
DATED : November 28, 2023
INVENTOR(S) : Mumma et al.

It is certified that error appears in the above-identified patent and that said Letters Patent is hereby corrected as shown below:

In the Claims

In Claim 11, at Column 12, Line 16, please delete "upper" before "first".

In Claim 16, at Column 12, Line 51, please delete "surface" and insert --surfaces--.

Signed and Sealed this
Fifth Day of March, 2024

Katherine Kelly Vidal
*Director of the United States Patent and Trademark Office*